(12) United States Patent
McPhail et al.

(10) Patent No.: US 8,496,402 B2
(45) Date of Patent: *Jul. 30, 2013

(54) PADDLE STYLE LAND FILL COMPACTOR WHEEL TIP

(75) Inventors: James D. McPhail, Peoria, IL (US); Michael Hans Hinrichsen, Congerville, IL (US); Randy E. Schoepke, Lacon, IL (US)

(73) Assignee: Caterpillar Inc., Peoria, IL (US)

( * ) Notice: Subject to any disclaimer, the term of this patent is extended or adjusted under 35 U.S.C. 154(b) by 153 days.

This patent is subject to a terminal disclaimer.

(21) Appl. No.: 12/827,695

(22) Filed: Jun. 30, 2010

(65) Prior Publication Data

US 2012/0003041 A1    Jan. 5, 2012

(51) Int. Cl.
*E02D 3/026* (2006.01)
(52) U.S. Cl.
USPC .......................... 404/124; 404/128
(58) Field of Classification Search
USPC ................ 404/121, 122, 124, 128; 37/452, 37/454
See application file for complete search history.

(56) References Cited

U.S. PATENT DOCUMENTS

| | | |
|---|---|---|
| 3,252,391 A | 5/1966 | Dils, Jr. |
| 3,274,908 A | 9/1966 | Grant et al. |
| 3,598,028 A | 8/1971 | Grant et al. |
| 3,656,418 A | 4/1972 | Lutz |
| 3,891,341 A | 6/1975 | Trainor et al. |
| 4,066,375 A | 1/1978 | Caron et al. |
| 4,074,942 A | 2/1978 | Cochran |
| 4,530,620 A | 7/1985 | McCartney |
| 4,668,122 A | 5/1987 | Riddle |
| 4,750,792 A | 6/1988 | Caron et al. |
| 4,865,400 A | 9/1989 | Caron et al. |
| 4,919,566 A | 4/1990 | Caron et al. |
| 5,217,321 A | 6/1993 | Corcoran et al. |
| 5,217,322 A | 6/1993 | Corcoran et al. |
| 5,358,355 A | 10/1994 | Brockway |
| 5,769,507 A | 6/1998 | Brockway |
| 5,795,097 A | 8/1998 | Caron et al. |
| 5,967,242 A | 10/1999 | Caron et al. |
| 6,095,717 A | 8/2000 | Kaldenberg et al. |
| D453,940 S | 2/2002 | McCartney |

(Continued)

FOREIGN PATENT DOCUMENTS

| | | |
|---|---|---|
| EP | 1473412 | 11/2004 |
| GB | 2 214 878 A | 9/1989 |

OTHER PUBLICATIONS

Caron Compactor Company, Inc. website pages, http://caroncompactor.com/products/new-compactors (28 pages), Feb. 2, 2011.

(Continued)

*Primary Examiner* — Matthew D Troutman
(74) *Attorney, Agent, or Firm* — Miller, Matthias & Hull

(57) ABSTRACT

A compactor wheel tip for a landfill or soil compactor comprises a bottom wall having a wheel engaging surface, a top wall having a ground engaging surface, oppositely disposed front and rear walls having concave surfaces, and oppositely disposed side walls. The ground engaging surface of the top wall may be generally planar and have a "bow-tie"-shaped cross-section, or the top wall may define a pair of shoulders each extending inwardly from one of the side walls, and a rib extending between the shoulders and having a depth that is less than the depth of shoulders. The ground engaging surface may further define a pair of exterior pockets disposed on opposite sides of the rib and extending downwardly between the rib and corresponding portions of the front and rear walls.

9 Claims, 12 Drawing Sheets

U.S. PATENT DOCUMENTS

| | | | |
|---|---|---|---|
| 6,619,883 | B2 | 9/2003 | Livesay et al. |
| 6,632,045 | B1 | 10/2003 | McCartney |
| 6,682,262 | B2 | 1/2004 | Caron et al. |
| 6,991,401 | B1 | 1/2006 | Caron |
| 7,108,452 | B2 * | 9/2006 | Caron et al. .................. 404/124 |
| 2002/0048489 | A1 * | 4/2002 | Caron et al. .................. 404/124 |
| 2004/0033107 | A1 | 2/2004 | Caron et al. |
| 2008/0196281 | A1 | 8/2008 | Livesay et al. |
| 2009/0045669 | A1 | 2/2009 | McPhail et al. |
| 2009/0313805 | A1 | 12/2009 | McPhail et al. |

OTHER PUBLICATIONS

HJ Industries website pages, http://hjindustries.com/ (2 pages), http://hjindustries.com/TracPacCombactorWheels.html (2 pages), http://hjindustries.com/LandfillCleats.html (2 pages), Feb. 2, 2011.

Macpactor Compaction Technologies website pages, http://www.macpactor.co.uk/index.php (1 page), http://www.macpactor.co.uk/index.php?substance=m-trax (1 page), http://www.macpactor.co.uk/index.php?substance=compax (1 page), Feb. 2, 2011.

Terra Compactor Wheel Corp. website pages, http://terra.smugmug.com/Portfolio/Terra-Compactor-Wheel/13948699_FaU2z#P-1-10 (5 pages), http://terra.smugmug.com/Portfolio/Terra-Compactor-Wheel/13948699_FaU2z#P-2-10 (5 pages), http://terra.smugmug.com/Portfolio/Terra-Compactor-Wheel/13948699_FaU2z#P-3-10 (5 pages), http://terra.smuqmuq.com/Portfolio/Terra-Compactor-Wheel/13948699_FaU2z#P-4-10 (7 pages), http://terra.smuqmuq.com/Portfolio/Terra-Compactor-Wheel/13948699_FaU2z#P-5-10 (7 pages), Feb. 2, 2011.

* cited by examiner

PADDLE STYLE LAND FILL COMPACTOR WHEEL TIP

TECHNICAL FIELD

This disclosure relates generally to wheel tips for landfill and soil compactors.

BACKGROUND

Landfill compactors are machines which move over landfill deposits to compact the trash. Compacting the trash maximizes the use of the landfill. When the trash is compacted, more material can be disposed in the landfill because it is deposited more densely. Compacting the trash also helps to ensure long term structural stability of the landfill when it is filled and capped with soil. Similarly, soil compactors are machines which move over soil, gravel, or other materials to compact the material in preparation for road construction or other construction purposes.

Landfill compactors and soil compactors typically feature large, heavy steel wheels. The bodies of the machines are also heavy, and the combined weight of the body and the set of wheels on each machine provides the necessary downward force for compaction. To increase the compactive capability, compactor wheels have often been fitted with tips to concentrate the weight force. This is especially common on landfill compactors, where the tips help compact the trash by breaking and grinding it into smaller pieces. The tips are mounted on the cylindrical, ground facing surface of the wheels which is often formed by a wheel wrapper, a relatively thick section of plate steel that is bent around and welded to the wheel hub. The tips extend radially outward from the wheel wrapper in a direction away from the center rotational axis of the wheel.

Many different landfill compactor tips have been developed for use on compactor wheels. One example of a compactor tip is disclosed in U.S. Pat. No. 3,891,341, issued Jun. 24, 1975, and has a generally square base with a work face having a "dog-bone" outline with larger dimensions extending axially of the wheel. Another example provided by U.S. Pat. No. 4,074,942, issued Feb. 21, 1978, has a cross-shaped tip portion with tapered or concave surfaces extending downwardly to a generally rectangular body portion. U.K. Patent Appl. Publ. GB 2 214 878, published on Sep. 13, 1989, teaches a generally flat plate-like paddle mounted on a compactor wheel and supported on one side by a wedge or gusset. In a further example, U.S. Pat. No. 5,358,355, issued Oct. 25, 1994, teaches a cleat having sides sloping downward from a cutting face towards a bottom face, and generally toward opposite ends of the cleat, to produce a generally inverted wedge or V-shaped appearance of the cleat. As another example, U.S. Pat. No. 6,619,883, issued Sep. 16, 2003, provides a compactor tooth having a ground engaging surface with a "plus-" symbol profile that increases in cross-section in the forward and rearward directions as the tooth extends from the tip downward toward a mounting block.

As discussed above, these and other compactor wheel tips are provided to improve the compaction of the trash and the soil over which the compactor machines are driven. Compaction is important in the landfill environment because a landfill has a finite amount of space available, so the more densely the trash can be compacted, the more efficiently the space is used, and the more profitable the landfill as a going concern. Consequently, optimizing the compaction achieved by a wheel tip is a consideration for those skilled in the art when designing wheel tips. Closely related to the issue of compaction is the concept of "fluffing." Fluffing is the tendency of a particular wheel tip or wheel tip assembly to pull the material back up as the tip is exiting the surface of the compacted material, and thereby undoing a certain amount of compaction that was achieved by the tip. Fluffing may be caused by material sticking to the tip and being pulled up as the wheel rotates away from the surface. Fluffing may also occur where edges of the tip engage the material as the tip rotates out of the hole in the surface. The smallest amount of fluffing may be undesirable.

The traction provided by the wheel tips is also a factor considered by those skilled in the art when designing the tips. Traction is important because it allows the machine to move through the trash and to perform the task of compacting the trash or the soil. Traction is more perceivable by the operator of the machines than compaction, but both factors are important in the design of the tip. Traction causing the wheels to propel the machine forward over the surface with minimal slippage is of primary concern. Additionally, traction against lateral slippage, such as can occur when the machine is on the side-slope of a hill, is also an important consideration in compactor wheel tip design.

Packing refers to the adherence of material to the tips and the wheel as the compactor machine passes over the surface. As material packs on the wheel, just as when mud cakes on a shoe, the traction provided by the tips degrades and slippage of the wheels increases. Additional torque may be required to be applied to the wheels due to the added weight of the packed material. Some compactors are equipped with cleaner fingers to remove packed material between the tips, but not all can be removed. Consequently, minimizing the amount of material packing occurring to the wheels is a further consideration of the person skilled in the art performing compactor wheel tip design.

The surfaces over which the compactor machines travel includes abrasive materials that wear away the metal of the compactor wheel tip over time. Materials such as sand and rock may be harder than the metal from which the tips are fabricated, and the friction of the abrasive material removes metal from the tip. The wear rate is not uniform at all points on the compactor tip, so the ground engaging surface of the tip is reshaped over tip as more metal is removed from, for example, the lateral edges of the tips. It is desirable to have compactor tips designed to provide extended though not unlimited useful lives over which the tips provide an acceptable combination of traction and compaction, even as the abrasive materials wear away the metal of the compactor tips and reshape the ground engaging surface.

A need exists for a new technology for compactor wheel tips that may balance these trade-offs to provide a compactor wheel tip that is durable and wear resistant, and provides an acceptable level of traction and compaction for the compactor wheel during the compaction wheel tip's useful life.

SUMMARY OF THE DISCLOSURE

According to certain aspects of this disclosure, a compactor wheel tip is provided having a bottom wall having a wheel engaging surface, a top wall having a ground engaging surface, oppositely disposed front and rear walls extending upwardly from the bottom wall to the top wall, with the front and rear walls having a concave shape and the distance between the front and rear walls being greater proximate the bottom wall than proximate the top wall, and a pair of oppositely disposed side walls extending upwardly from the bottom wall to the top wall.

In another aspect of the disclosure that may be combined with any of these aspects, the front and rear walls each have a curved portion having a curvature causing the distance between the front and rear walls to decrease as the curved portions extend upwardly away from the bottom wall and toward the top wall.

In another aspect of the disclosure that may be combined with any of these aspects, the curved portions of each of the front and rear walls extend outwardly from a first vertical plane extending through the compactor wheel tip from front to back such that the distance between the front and rear walls increases as the front and rear walls extend outwardly from the first vertical plane toward the side walls.

In another aspect of the disclosure that may be combined with any of these aspects, the curved portions of each of the front and rear walls extend outwardly from a first vertical plane bisecting the compactor wheel tip from front to back at a pocket angle $\Phi$ with respect to a line perpendicular to the first vertical plane such that the distance between the front and rear walls increases as the front and rear walls extend outwardly from the first vertical plane toward the side walls.

In another aspect of the disclosure that may be combined with any of these aspects, the pocket angle $\Phi$ has a value in a range from 2.5° to 5.5°.

In another aspect of the disclosure that may be combined with any of these aspects, the side walls have a generally convex shape.

In another aspect of the disclosure that may be combined with any of these aspects, a depth of the top wall is greater than a width of the top wall.

In another aspect of the disclosure that may be combined with any of these aspects, the ground engaging surface defines a pair of shoulders each extending inwardly from a corresponding one of the side walls, and a rib extending between the shoulders and having a depth that is less than the depth of shoulders.

In another aspect of the disclosure that may be combined with any of these aspects, portions of the front and rear walls proximate the top wall extend outwardly from a first vertical plane bisecting the compactor wheel tip from front to back at a pocket angle $\Phi$ with respect to a line perpendicular to the first vertical plane such that the distance between the front and rear walls increases as the front and rear walls extend outwardly from the first vertical plane toward the side walls, and portions of the ground engaging surface defining front and rear walls of the rib extend outwardly from the first vertical plane at the pocket angle $\Phi$.

In another aspect of the disclosure that may be combined with any of these aspects, the ground engaging surface defines a pair of exterior pockets disposed on opposite sides of the rib and extending between the shoulders, wherein the exterior pockets extend downwardly between the rib and corresponding portions of the front and rear walls.

In another aspect of the disclosure that may be combined with any of these aspects, intersecting portions of the top wall and the front and rear walls proximate the exterior pockets define upper edges of the respective exterior pockets, and a portion of the ground engaging surface defining the rib is higher with respect to the bottom wall than the upper edges of the exterior pockets.

In another aspect of the disclosure that may be combined with any of these aspects, portions of the front and rear walls proximate the top wall extend outwardly from a first vertical plane bisecting the compactor wheel tip from front to back at a pocket angle $\Phi$ with respect to a line perpendicular to the first vertical plane such that the distance between the front and rear walls increases as the front and rear walls extend outwardly from the first vertical plane toward the side walls, and portions of the ground engaging surface defining front and rear walls of the exterior pockets extend outwardly from the first vertical plane at the pocket angle $\Phi$.

In another aspect of the disclosure that may be combined with any of these aspects, a compactor wheel tip includes a bottom wall having a wheel engaging surface, a top wall having a ground engaging surface, oppositely disposed front and rear walls extending upwardly from the bottom wall to the top wall with the distance between the front and rear walls decreasing as the front and rear walls extend from the bottom wall toward the top wall, and a pair of oppositely disposed side walls extending from the bottom wall to the top wall and having lateral edges intersecting with corresponding lateral edges of the front and rear walls. The ground engaging surface defines a pair of shoulders each extending inwardly from a corresponding one of the side walls, a rib extending between the shoulders, and a pair of exterior pockets disposed on opposite sides of the rib and extending between the shoulders, wherein the exterior pockets extend downwardly between the rib and corresponding portions of the front and rear walls. The front and rear walls each have a curved portion having a curvature causing the distance between the front and rear walls to decrease as the curved portions extend upwardly away from the bottom wall and toward the top wall, wherein the curved portions of each of the front and rear walls extend outwardly from a first vertical plane bisecting the compactor wheel tip from front to back at a pocket angle $\Phi$ with respect to a line perpendicular to the first vertical plane such that the distance between the front and rear walls increases as the front and rear walls extend outwardly from the first vertical plane toward the side walls.

In another aspect of the disclosure that may be combined with any of these aspects, the front and rear walls each have generally vertical top portions disposed between the top wall and corresponding curved portions, and the top portions of the front and rear walls extending outwardly from the first vertical plane toward the side walls with the same pocket angle $\Phi$ as the curved portions.

In another aspect of the disclosure that may be combined with any of these aspects, the front and rear walls each have generally vertical bottom portions disposed between the bottom wall and corresponding curved portions, and the bottom portions of the front and rear walls extend outwardly from the first vertical plane at a draft angle $\Delta$ with respect to a line perpendicular to the first vertical plane such that the distance between the front and rear walls decreases as the front and rear walls extend outwardly from the first vertical plane toward the side walls.

In another aspect of the disclosure that may be combined with any of these aspects, portions of the ground engaging surface defining the shoulders are higher with respect to the bottom wall than a portion of the ground engaging surface defining the rib.

In another aspect of the disclosure that may be combined with any of these aspects, the side walls extend outwardly from a second vertical plane bisecting the compactor wheel tip from side to side at a draft angle $\Delta$ with respect to a line perpendicular to the second vertical plane such that the distance between the side walls decreases as the side walls extend outwardly from the second vertical plane toward the front and rear walls.

Additional aspects of the invention are defined by the claims of this patent.

DETAILED DESCRIPTION

Figure 1:
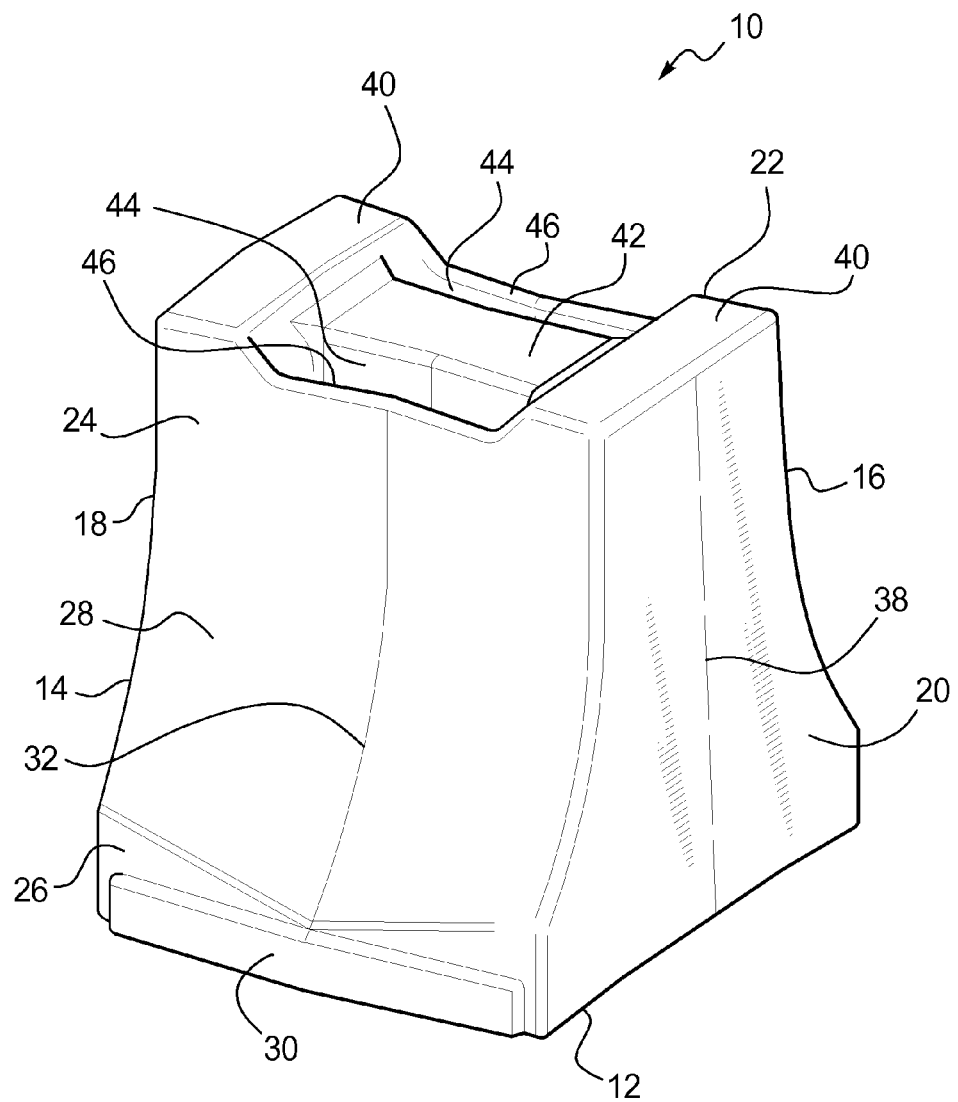
FIG. 1 is a pictorial view paddle style landfill compactor wheel tip in accordance with the present disclosure.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

FIGS. 1-6 illustrate one embodiment of a compactor wheel tip 10 in accordance with the present disclosure. The compactor wheel tip 10 may be designed to provide a desirable combination of compaction of trash or soil over which the compactor passes, traction between the wheels and the surface over which the compactor travels in the direction of travel and laterally, and absence of packing of the compacted material onto the surfaces of the compactor wheel tips 10 and the wheel itself. As shown in the drawing figures, the compactor wheel tip 10 in the illustrated embodiment may include generally concave front and rear walls tapering inwardly from the base to the top of the compactor wheel tip. The concavity of front and rear walls may improve the ability of the compactor wheel tip 10 to cup the material over which the wheel passes and propel the compactor forward with reduced slippage. At the same time, the concavity and tapering may reduce the adherence of material to the surfaces of the compactor wheel tip 10 to reduce packing of material on the tip 10 and wheel and fluffing at the surface as the compactor wheel tip 10 rolls out of the compacted material. Additionally, the ground engaging surface of a top wall of the compactor wheel tip 10 may be designed to present a relatively large surface area for greater compaction of the trash or soil as the wheel roll over the surface. The ground engaging surface may also have additional metal distributed toward the lateral sides of the compactor wheel tip 10 where metal is expected to wear away at a faster rate, thereby prolonging the useful life of the compactor wheel tip 10.

Referring to FIG. 1, the compactor wheel tip 10 may include a bottom wall 12 having a wheel engaging surface that may face and be secured to a corresponding portion of the surface of the wheel, oppositely disposed front and rear walls 14, 16, respectively, and oppositely disposed side walls 18, 20 extending upwardly from the bottom wall 12 and terminating at a top wall 22 having a ground engaging surface. The wheel engaging surface of the bottom wall 12 may be shaped to conform to the surface of the compactor wheel to which the compactor wheel tip 10 may be attached. Consequently, the edges of the bottom wall 12 proximate the front and rear walls 14, 16 may be relatively straight to correspond to the constant diameter of the wheel in the axial direction, while the portions of the wheel engaging surface proximate the side walls 18, 20 may have a curvature from front to back corresponding the curvature of the perimeter of the wheel as best seen in FIG. 2.

Returning to FIG. 1, the front and rear walls 14, 16 of the compactor wheel tip 10 may each have a generally concave shape such that the trash or soil engaged thereby may be cupped as the wheel rolls over the surface in a similar manner as swimmer's hands cup the water as the swimmers propel themselves through the water. Each of the front and rear walls 14, 16 may include a generally vertical top portion 24, a generally vertical bottom portion 26, and a curved intermediate portion 28. As best seen in FIG. 2, the top and bottom portions 24, 26 may have a generally vertical orientation with straight lateral edges at the intersection of the portions 24, 26 with the edges of the side walls 18, 20. A draft angle with respect to a vertical line may provide the top and bottom portions 24, 26 with a slight inward taper to facilitate removal of the compactor wheel tip 10 from its mold during the molding or casting process.

Based on the properties of the metal from which the compactor wheel tip 10 and the wheel are fabricated, welding of the tip 10 to the wheel typically needs to be performed in a controlled environment with specific preheating requirements to ensure the necessary bond is formed between the tip 10 and the wheel. However, the conditions are generally not readily controllable when the tips 10 are being installed in the field. Welding of the tip 10 to the wheel in less than ideal conditions may be accomplished by providing a butter bead 30 of weld-conducive metal along the bottom portions 26 proximate the bottom wall 12 of the tip 10. When the tip 10 is installed on the wheel in the field, the metal of the butter bead 30 is welded to create fillets between the front and rear edges of the bottom wall 12 and the surface of the wheel without the same preheating requirements of a direct tip-to-wheel weld.

Figure 2:
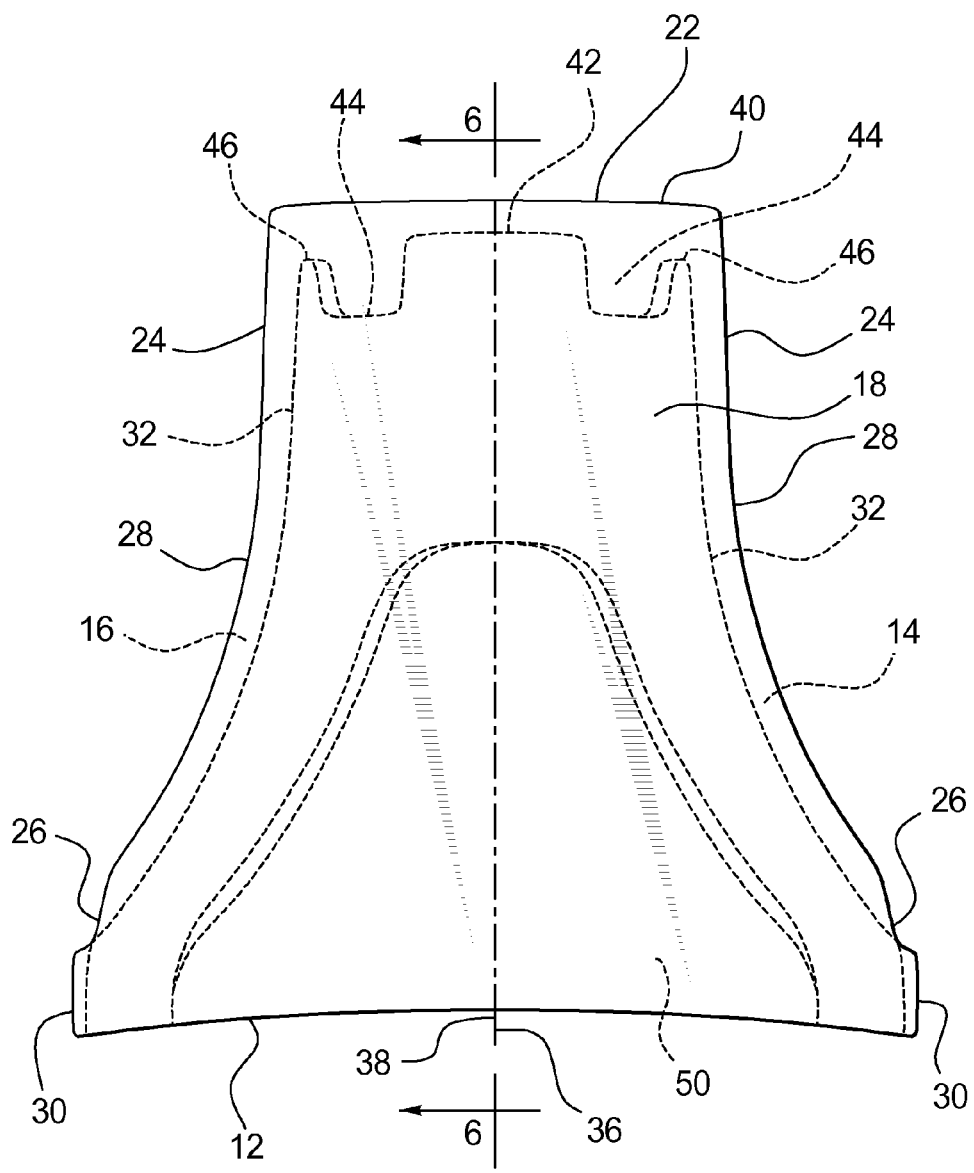
FIG. 2 is a side view of the compactor wheel tip of FIG. 1.

The side view of FIG. 2 further illustrates the curvature of the curved portions 28 of the front and rear walls 14, 16. The curved portions 28 extend upwardly between the top and bottom portions 24, 26 with a curvature causing the distance between the front and rear walls 14, 16 to decrease as the curved portions 28 extend toward the top wall 22. Due to the curvature, the rate of decrease in the distance lessens as the curved portions 28 reach the point of transition with the top portions 24 of the walls 14, 16. In standard implementations, the compactor wheel tip 10 may be approximately 7 inches (approximately 17.78 centimeters) tall, the curved portions 28 may be provided with a radius of curvature of approximately 160 mm (approximately 6.25 inches), and the front and rear walls 14, 16 may be provided with a transitional radius of approximately 100 mm (approximately 3.937 inches) between the curved portions 28 and top portions 24 to avoid sharp transitions in the surfaces of the walls 14, 16 that may tend to promote packing of material on the tip 10.

To further develop the concavity of the front and rear walls 14, 16 of the compactor wheel tip 10, the top portions 24 and curved portions 28 may be provided with pocket angles creating an effect wherein an approximate centerline 32 of each of the walls 14, 16 is recessed inwardly within the tip 10, and the lateral side edges of the corresponding portions of the walls 14, 16 extend more forwardly and rearwardly, respectively. As shown in the top view of FIG. 3, the compactor wheel tip 10 of the present embodiment may be bisected from front to back by a first vertical plane 34 extending through the center of the tip 10. The surfaces of the top portions 24 and curved portions 28 of the walls 14, 16 may extend outwardly from the first vertical plane 34 at a pocket angle $\Phi_w$ with respect to a line perpendicular to the first vertical plane 34 such that the distance between the walls 14, 16 increases as the front and rear walls 14, 16 approach the side walls 18, 20. The pocket angle $\Phi_w$ may have a value up to approximately 10°, and may be within the range from 2.5° to 5.5°, such as angles of approximately 3° or approximately 5°. The pocket angle $\Phi_w$ along with the curvature of the curved portions 28 combine to form concave exterior pockets of the front and rear walls 14, 16 that may improve traction by cupping the material over which the compactor machine passes to propel the compactor forward, and may promote even wear of the compactor wheel tip 10 by distributing more metal to the lateral edges of the walls 14, 16 where metal of the tip 10 may be worn away at a faster rate.

While the pocket angle $\Phi_w$ of the top portions 24 and curved portions 28 may create concavity, extending the pocket angle $\Phi_w$ to the bottom portions 26 of the walls 14, 16 may have the adverse affect of promoting packing along the edges of attachment of the bottom wall 12 to the wheel. The issue of packing is addressed at least partially by having the bottom portions 26 present a generally convex surface tending to direct material toward the sides of the compactor wheel tip 10 as a deterrent to packing along the weld formed with the butter bead 30. The convex shape may be achieved by having the bottom portions 26 of the front and rear walls 14, 16 extend outwardly from the first vertical plane 34 at a draft angle $\Delta_F$ with respect to a line perpendicular to the first vertical plane 34 such that the distance between the front and rear walls 14, 16 decreases as the walls 14, 16 approach the side walls 18, 20. As with the pocket angle $\Phi_w$, the draft angle $\Delta_F$ may have a value up to approximately 10°, and may be within the range from 2.5° to 5.5°, such as angles of approximately 3° or approximately 5°, to provide the desired convex surface of the bottom portions 26.

While exterior pockets having the desired concavity may be formed in the walls 14, 16 by the combination of the curvature of the curved portion 28 and the pocket angle $\Phi_w$, those skilled in the art will understand that a desired amount of concavity may be achieved using various combinations of curvature and pocket angles $\Phi_w$. For example, the curvature of the intermediate portion 28 may be eliminated, and the intermediate portion 28 may present a generally flat, planar surface extending between the generally vertical top and bottom portions 24, 26 with exception of the pocket angles $\Phi_w$ contributing to the concavity of the walls 14, 16. Conversely, the pocket angles $\Phi_w$ of the curved portions 28 and/or the top portions 24 may be eliminated while maintaining the curvature of the intermediate portion 28. As a further alternative, the surfaces of the curved portions 28 and/or the top portions 24 may have a convex curvature as the walls 14, 16 extend toward the side walls 18, 20 from the centerlines 32 of the walls 14, 16, even to the extent of having a continuous curvature from side-to-side wall without a discernible centerline 32.

Additional configurations of the top portions 24 and intermediate portions 28 forming generally concave surfaces of the walls 14, 16 will be apparent to those skilled in the art, and are contemplated by the inventors as having use in compactor wheel tips in accordance with present disclosure. Moreover, while the front and rear walls 14, 16 are illustrated as being symmetrical about the first vertical plane 34, it is contemplated that the walls 14, 16 may have generally concave shapes that are not symmetrical about a central vertical plane extending through the walls 14, 16. For example, the centerlines 52 may not necessarily be centered between the side walls 18, 20, and instead may be offset toward one of the side walls 18, 20 or the other, but with the general concavity of the front and rear walls 14, 16 being maintained.

Figure 3:
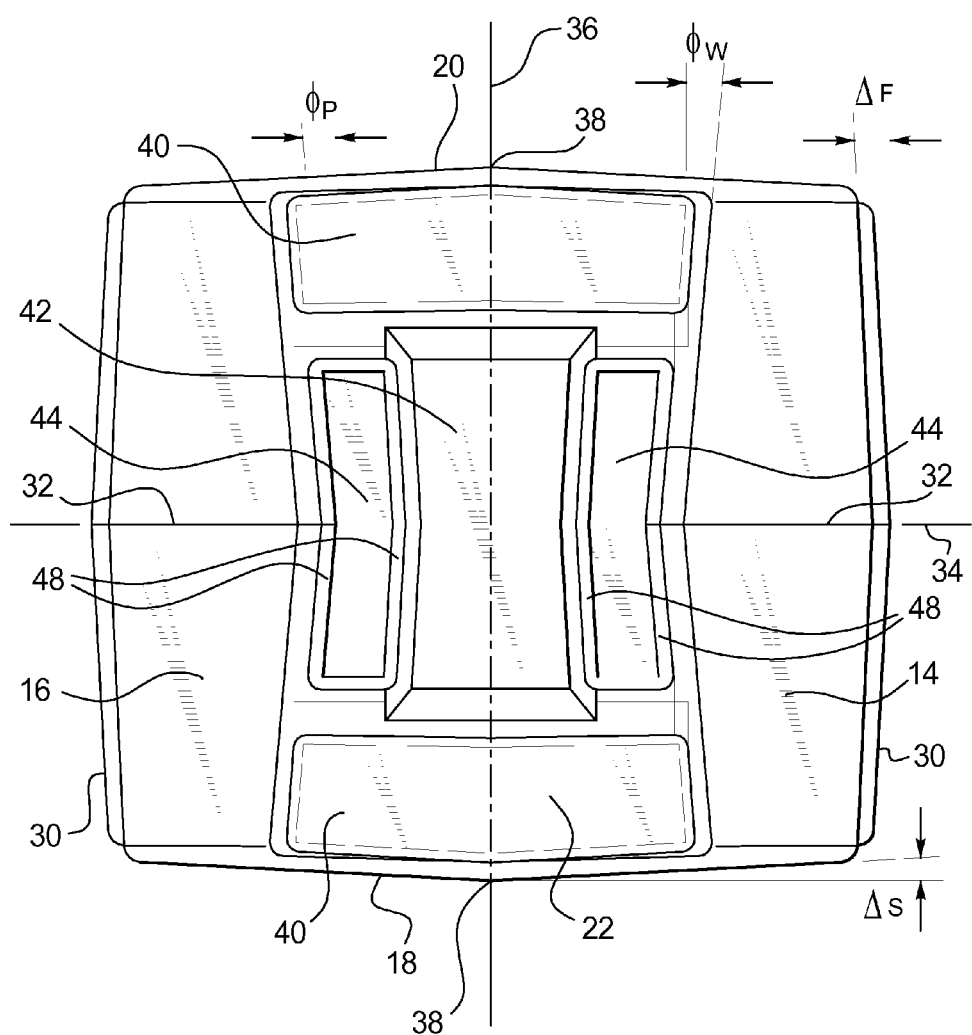
FIG. 3 is a top view of the compactor wheel tip of FIG. 1.
Figure 4:
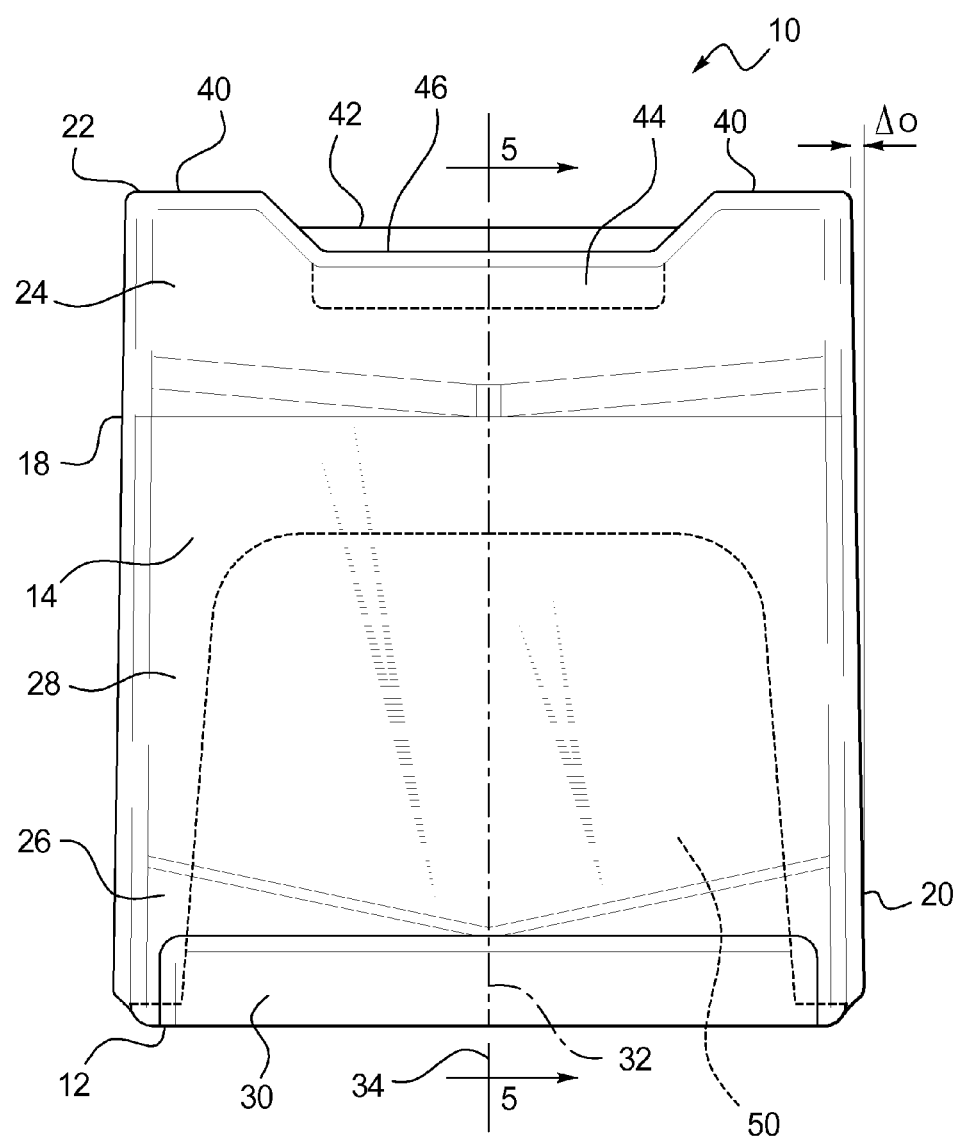
FIG. 4 is a front view of the compactor wheel tip of FIG. 1.
Figure 5:
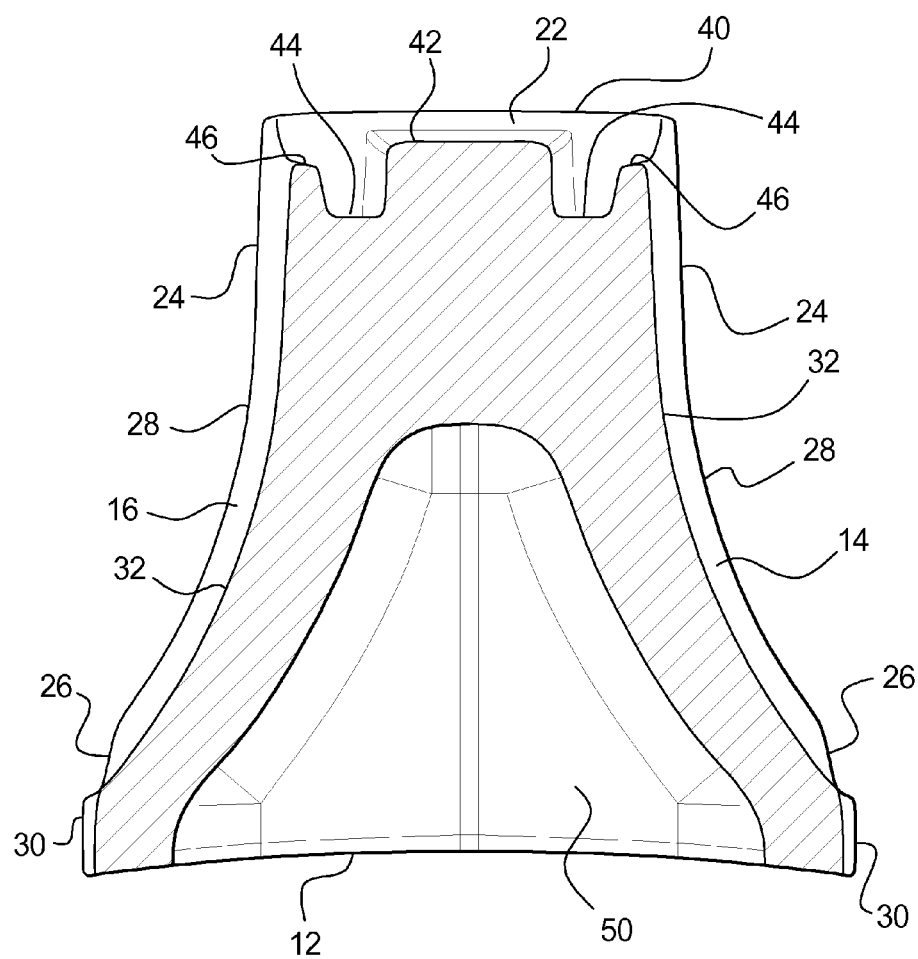
FIG. 5 is a cross-sectional view taken through line 5-5 in FIG. 4 of the compactor wheel tip of FIG. 1.

The side walls 18, 20 extend generally vertically from the bottom wall 12, and may have an outer vertical draft angle $\Delta_O$ with respect to a vertical line as shown in FIG. 4 providing the side walls 18, 20 with a slight inward taper to facilitate removal of the compactor wheel tip 10 from its mold during the molding or casting process. The draft angle $\Delta_O$ may be up to approximately 10°, with the draft angle $\Delta_O$ of approximately 3° being shown in FIG. 4. The side walls 18, 20 may also provide slightly convex side surfaces for the compactor wheel tip 10 as shown in FIGS. 1 and 3. As shown in the top view of FIG. 3, the compactor wheel tip 10 may be bisected from side to side by a second vertical plane 36 extending through approximate centerlines 38 of the side walls 18, 20. The surfaces of the side walls 18, 20 may extend outwardly from the second vertical plane 36 at a side draft angle $\Delta_S$ with respect to a line perpendicular to the second vertical plane 36 such that the distance between the side walls 18, 20 decreases as the walls 18, 20 approach the front and rear walls 14, 16. The draft angle $\Delta_S$ may have a value up to approximately 10°, and may be within the range from 2.5° to 5.5°, such as angles of approximately 3° or approximately 5°, to provide the desired convex surface of the side walls 18, 20. Moreover, the draft angle $\Delta_S$ may have a value approximately equal to the value of the draft angle $\Delta_F$. The side draft angle $\Delta_S$ may have provide the benefit of promoting self-cleaning of the compactor wheel tip 10 and reducing packing as the contoured sides 18, 20 allow the material to slide along the sides 18, 20 and direct the material outwardly to keep the sides 18, 20 of the tip 10 and corresponding portions of the wheel clean. As with the centerlines 32, the centerlines 38 need not necessarily be centered between the front and rear walls 14, 16 while retaining the generally convex surface of the side walls 18, 20.

Returning to FIG. 1, the ground engaging surface of the top wall 22 of the compactor wheel tip 10 may be configured to provide desired wear characteristics and for optimal compaction of the material over which the compactor machine passes. In the illustrated embodiment, the ground engaging surface of the top wall 22 may be contoured to define a pair of shoulders 40 each extending inwardly from the corresponding side walls 18, 20, and a rib 42 extending between the shoulders 40. The shoulders 40 may extend the entire thickness of the top wall 22 from the front wall 14 to the rear wall 16, while the rib 42 may be narrower, with outer edges disposed inwardly from the front and rear walls 14, 16. The ground engaging surface may further define a pair of exterior pockets 44 disposed on opposite sides of the rib 42 and extending between the shoulders 40. The exterior pockets 44 may extended downwardly below the shoulders 40 and rib 42 and between the rib 42 and corresponding portions of the front and rear walls 14, 16. The intersecting portions of the top wall 22 and the front and rear walls 14, 16 proximate the exterior pockets 44 may define upper edges 46 of the respective exterior pockets 44. As best seen in FIGS. 2 and 4-6, the ground engaging surface may define the shoulders 40, rib 42 and exterior pockets 44 such that the shoulders 40 are higher than the rib 42, and the rib 42 is higher than the upper edges 46 of the pockets 44. In embodiments where the tip 10 is formed by casting, sharper corners and edges may be formed than in a forged tip and having corner radii of less than 8 millimeters (0.315 inch). Sharper corners provide an increased amount of corner material for reducing rounding, and promote penetration into the surface and cutting of scrap material in the landfill.

The top wall 22 is the primary wear surface of the compactor wheel tip 10. Consequently, the shaping of the ground engaging surface affects the anticipated usable life of the tip 10 and the effectiveness of the tip 10 to compact the soil and to provide traction for the compactor wheel during that lifetime. Over time, the metal at the lateral sides of compactor wheel tips may wear away at up to three times the rate of the metal towards the middle of the tip. By lowering the rib 42 and defining the pockets 44 of the ground engaging surface, additional wear metal may be provided at the shoulders 40 to address the disparity in wear rates without increasing the overall metal and weight of the compactor wheel tip 10. After a period of use, the shoulders 40 may wear down and lose the sharpness of the corners, and eventually the shoulders 40 wear down to the level of the rib 42. At that point, however, the ground engaging surface self-sharpens and reshapes into a wedge shape that may still provide sufficient traction for the compactor wheel.

Though defining voids in the ground engaging surface, the exterior pockets 44 of the top wall 22 may assist in slowing the wear rate at the top wall 22. As the compactor wheel tip 10 digs into the surface, material is packed into the exterior pockets 44. The packed material has the abrasiveness to wear away the metal of the top wall 22 over time, and therefore should possess a natural abrasion resistance that is greater than metal from which the compactor wheel tip 10 is fabricated. As a result, the material packed in the exterior pockets 44 may function to slow the overall wear rate of the ground engaging surface. The exterior pockets 44 may further be configured to preserve the useful life of the exterior pockets 44 before the side walls wear away or break down and thereby eliminate containment of the abrasion resistant material. As discussed above, the edges 46 of the exterior pockets 44 are lower than the rib 42, thereby reducing the wear rate on the edges 46 until the rib 42 is partially worn away, and reducing the potential for barrier damage to the walls beneath the pocket edges 46. Additionally, as shown in the top view of FIG. 3, pocket walls 48 of the exterior pockets 44 may extend outwardly from the first vertical plane 34 of the tip at a pocket angle $\Phi_P$ that may be approximately equal to the pocket angle $\Phi_W$ of the front and rear walls 14, 16. The correspondence between the pocket angle $\Phi_P$ and the pocket angle $\Phi_W$ may result in relatively uniform thickness of the metal between the exterior pockets 44 and the front and rear walls 14, 16 and uniform wear to prolong the useful life of the exterior pockets 44 for containment of the abrasion resistant material.

Figure 6:
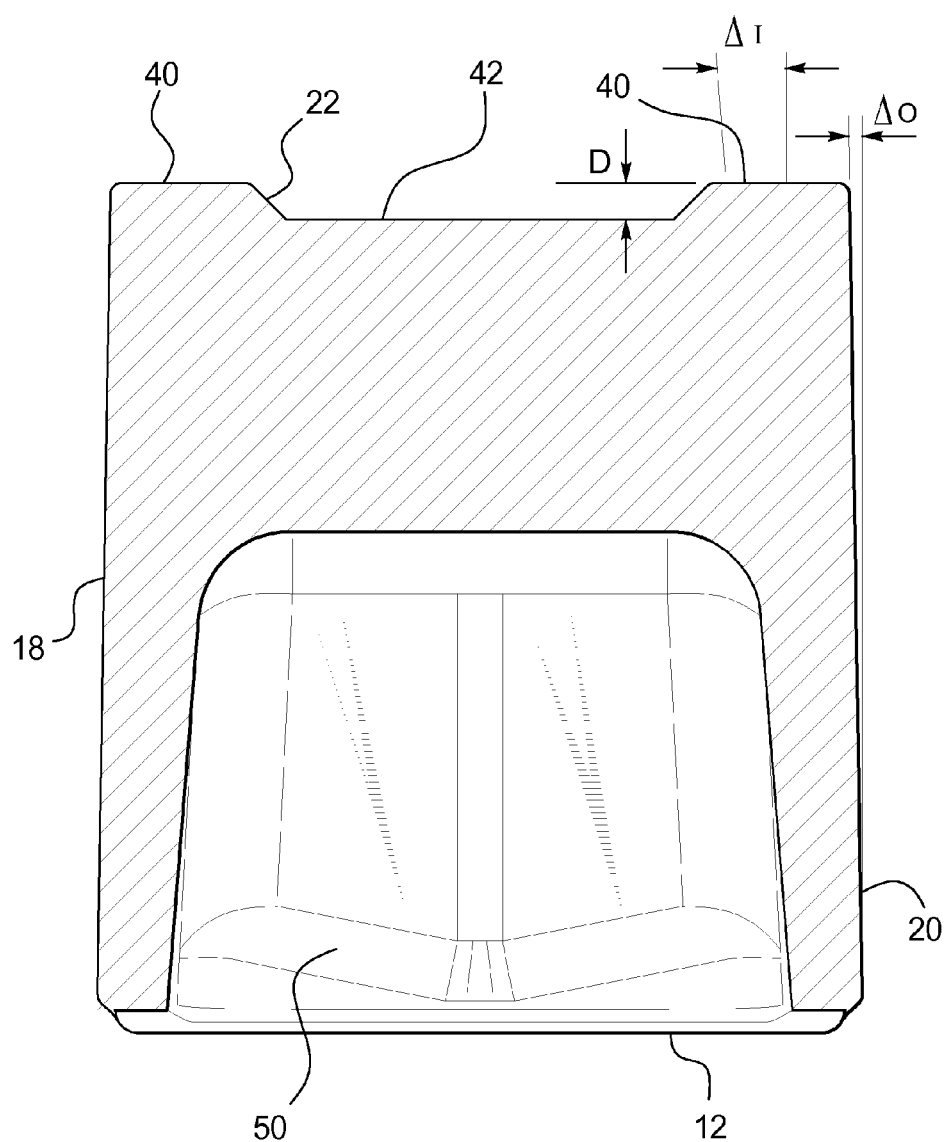
FIG. 6 is a cross-sectional view taken through line 6-6 in FIG. 2 of the compactor wheel tip of FIG. 1.

To reduce cost and weight of the compactor wheel tip 10 without compromising the useful life of the tip 10, excess metal may be removed from the tip 10 by providing an interior pocket 50 formed by an interior surface extending upwardly from the bottom wall 12 and wheel engaging surface and into the body of the tip 10. As shown in hidden lines in FIGS. 2 and 4, and in solid lines in the cross-sectional views of FIGS. 5 and 6, the interior pocket 50 may have the same general shape as the exterior surface of the tip 10. The similarity in shape may include having interior pocket angles and draft angles corresponding to the pocket angles $\Phi_W$ and draft angles $\Delta_F$ and $\Delta_S$. However, the interior pocket 50 may be tapered slightly more severely than the exterior walls 14-20 so that the walls are thicker and provide more wear material proximate the top of the interior pocket 50. Consequently, the side wall portions of the interior pocket 50 may have an interior pocket draft angle $\Delta_I$ with respect to a vertical line as shown in FIG. 6 that may be greater that the outer vertical draft angle $\Delta_O$ of the side walls 18, 20. To provide the necessary wall thickness, the interior draft angle $\Delta_I$ may be approximately 5°, with the steeper outer draft angle $\Delta_O$ being approximately 3°. The height of the interior pocket 50 may be established to provide a visible indication that the compactor wheel tip 10 has reached or exceeded its useful life when one of more of the walls 14-20 are worn through to expose the interior pocket 50 to the external environment.

Figure 7:
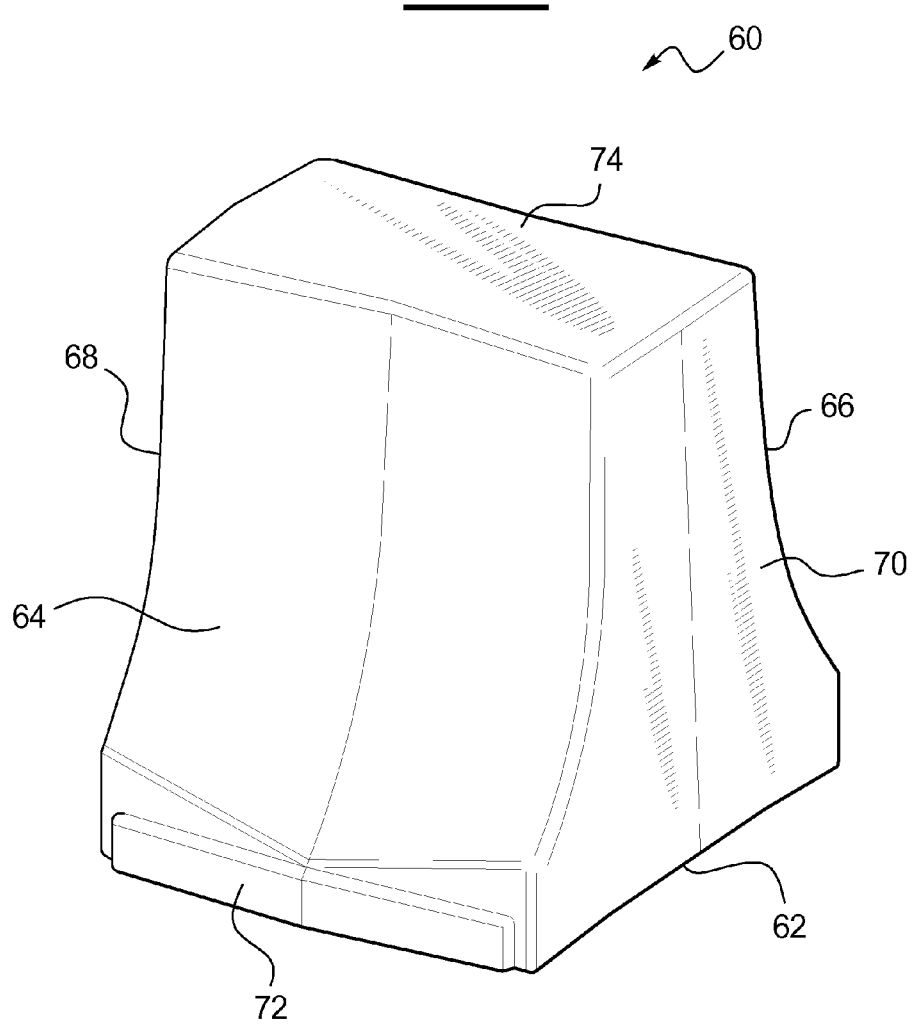
FIG. 7 is a pictorial view of an alternative embodiment of a paddle-style landfill compactor wheel tip in accordance with the present disclosure and having a flat ground engaging surface.

FIG. 7 illustrates an alternative embodiment of a compactor wheel tip 60 have a generally planar ground engaging surface. The compactor wheel tip 60 may include a bottom wall 62, front wall 64, rear wall 66 and side walls 68, 70 that may be configured in accordance with the descriptions of the walls 12-20, respectively, provided above. Consequently, the bottom wall 62 may include a wheel engaging surface, the front and rear walls 64, 66 may have generally concave shapes and include a butter bead 72 of weldable metal proximate the bottom wall 62, and the side walls 68, 70 may have generally convex shapes to reduce the amount of packing of material on the tip 60 and wheel. With this configuration, the walls 62-66 may address the design considerations of compaction, fluffing, traction and packing in a similar manner as the walls 12-16 as discussed above. A top wall 74 of the tip 60 may have a generally planar ground engaging surface in contrast to the contoured ground engaging surface of the top wall 22 of the tip 10. When the front and rear walls 64, 66 are configured with pocket angles $\Phi_W$, and the side walls 68, 70 are convex and include draft angles $\Delta_S$, the top wall 74 may have a "bow-tie"-shaped cross-section when viewed from above. In this configuration, the distance from front to back of the top wall 74 may be greater at the side edges than at the center, thereby providing additional wear metal at the lateral edges to compensate for the greater wear rate at the lateral edges.

Figure 8:
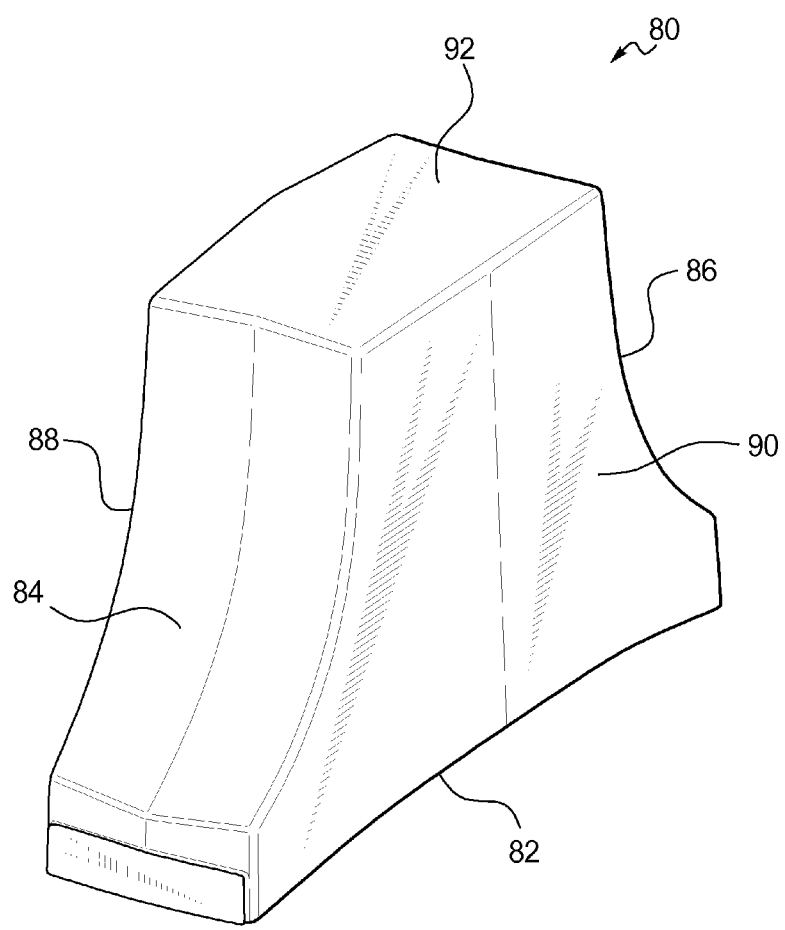
FIG. 8 is a pictorial view of a further alternative embodiment of a paddle style landfill compactor wheel tip in accordance with the present disclosure and having a flat ground engaging surface and providing increased side-slope traction.

A further alternative embodiment of a compactor wheel tip 80 shown in FIG. 8 may provide greater lateral traction for the compactor machine when traveling over a surface that is pitched from side to side. The compactor wheel tip 80 may be configured generally similar to the tips 10 and 60, and include a bottom wall 82, front wall 84, rear wall 86, side walls 88, 90 and a top wall 92. In this embodiment, however, the distance between the front and rear walls 84, 86 may be increased, while the width of the tip 80 between the side walls 88, 90 may remain constant, or may be decreased, resulting in the depth of the top wall 92 being greater than the width of the top wall 92. As a result of the increased depth, the side walls 88, 90 present a greater surface area in the compactor wheel's axial direction to greater resist lateral slippage of the compactor machine when traveling over a laterally pitched surface. The top wall 92 is illustrated as being planar similar to the top wall 74 of the tip 60. However, those skilled in the art will understand that the top wall 92 may be contoured similar to the ground engaging surface of the top wall 22 of the tip 10, and will further understand that the top wall 92 may be oriented with the shoulders extending inwardly from the side walls 88, 90, or with the shoulders extending inwardly from the front and rear walls 84, 86 if desired.

Industrial Applicability

Figure 9:
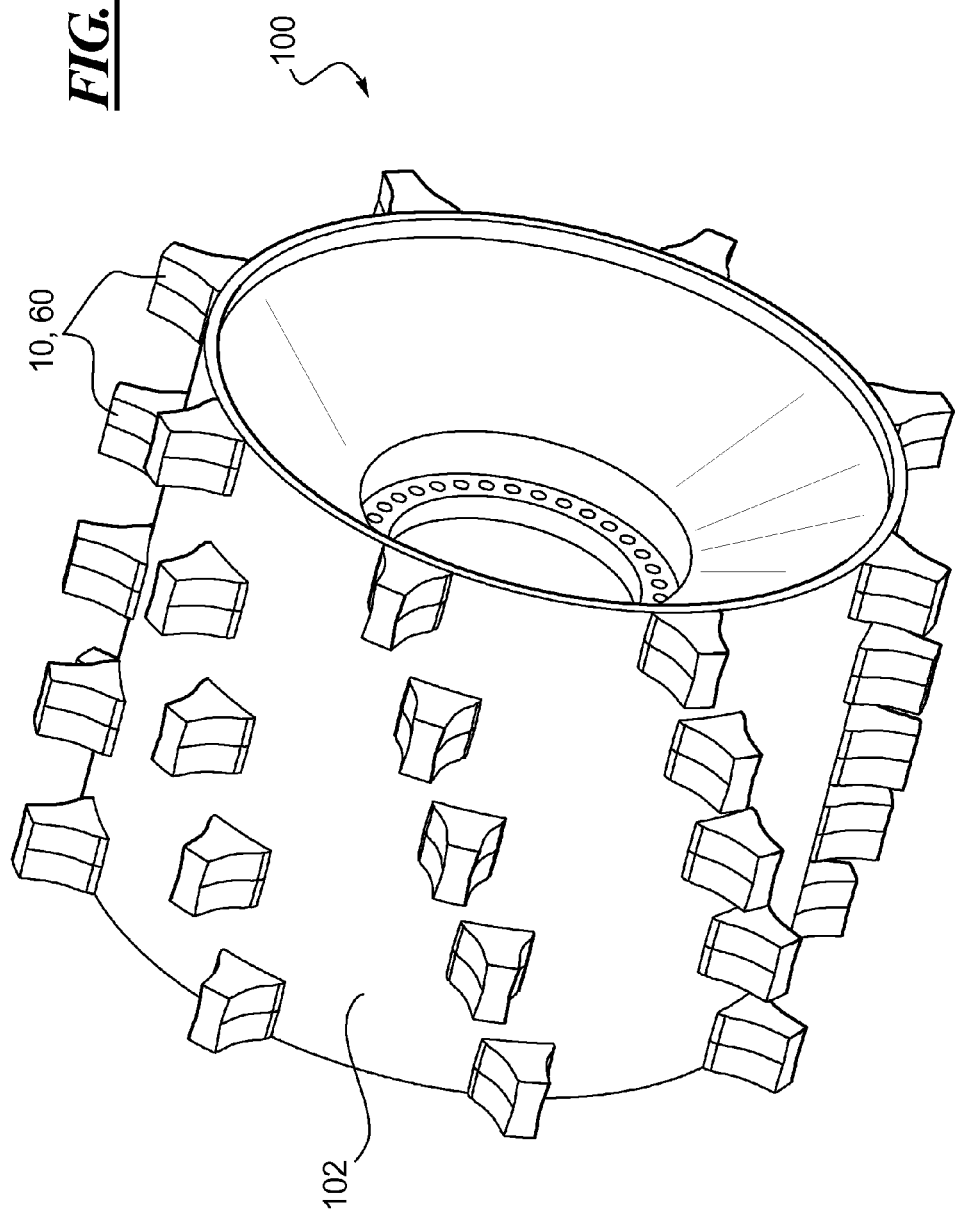
FIG. 9 is a pictorial view of a set of compactor wheel tips from FIG. 7 mounted to an exemplary landfill compactor wheel.

In general, the foregoing invention finds utility in various industrial applications, such as the construction and mining industry in providing an improved soil compacting tip for a soil compactor, and in the landfill and waste removal industries in providing an improved landfill compacting tip for landfill compactors. An exemplary landfill compactor wheel 100 having several compactor wheel tips 10 or 60 attached to the wheel wrapper 102 is illustrated in FIG. 9. The tips 10, 60 may be arranged on the wheel wrapper 102 in a commonly known helical pattern as shown, or in any other desirable arrangement about the wheel 100 known in the art. As the compactor wheel 100 rolls over the surface, the weight of the compactor machine causes the ground engaging surfaces of the tips 10, 60 to penetrate the surface and compact the material. The generally concave shape of the front walls of the tips 10, 60 may cup the surface to provide traction for propelling the wheel forward. The draft angles of the bottom potions of the front walls and the generally convex surfaces of the side walls may allow the tips 10, 60 to pass through the surface with minimal material packing on the tips 10, 60 and wheel 100. As the rotation of the wheel 100 continues, the tips 10, 60 roll out of the material. Due to the tapering of the front and rear walls from bottom to top, the tips 10, 60 may roll out of the surface with minimal engagement by the front edges of the tips 10, 60 with the pockets in the surface created by the tips 10, 60 to reduce fluffing at the surface in a similar manner that tapered gear teeth avoid binding with each other as they roll into and out of engagement.

Figure 10:
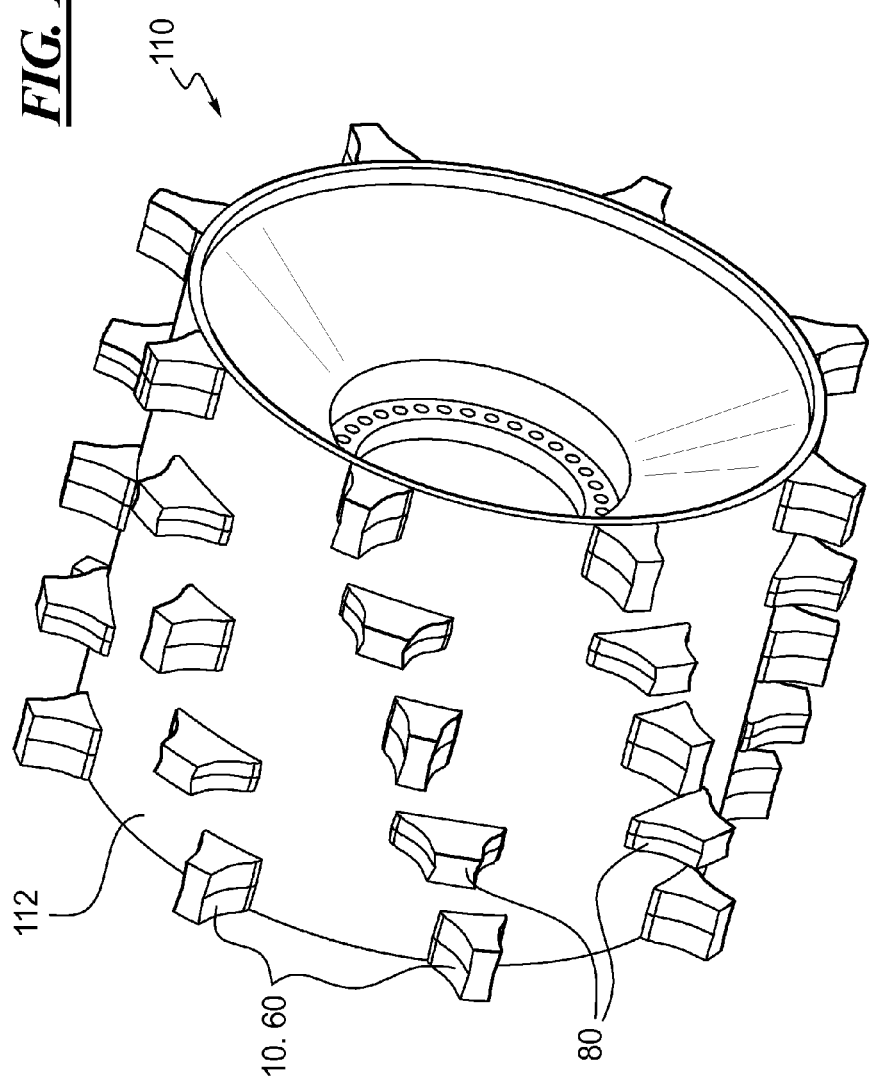
FIG. 10 is a pictorial view of a set of compactor wheel tips from FIGS. 7 and 8 mounted to an exemplary landfill compactor wheel.

Another exemplary landfill compactor wheel 110 shown in FIG. 10 includes both compactor wheel tips 10 or 60 and side-slope traction tips 80 attached to the wheel wrapper 102. The tips 10, 60 perform in a similar manner as described above for the wheel 100. The side-slope traction tips 80 provide additional lateral traction as the compactor machine travels over a laterally pitched surface. The additional side surface area of the combined tips 10, 60, 80 lessens the amount of slippage down the side slope of the hill experienced by compactor machine, thereby further stabilizing the machine during travel. As with the configuration of the tips 10, 60 on the wheel 100, the tips 10, 60, 80 may be arranged about the wheel wrapper 112 in any desired configuration to achieve the desired balance of compaction and traction during operation of the compactor machine.

Figure 11:
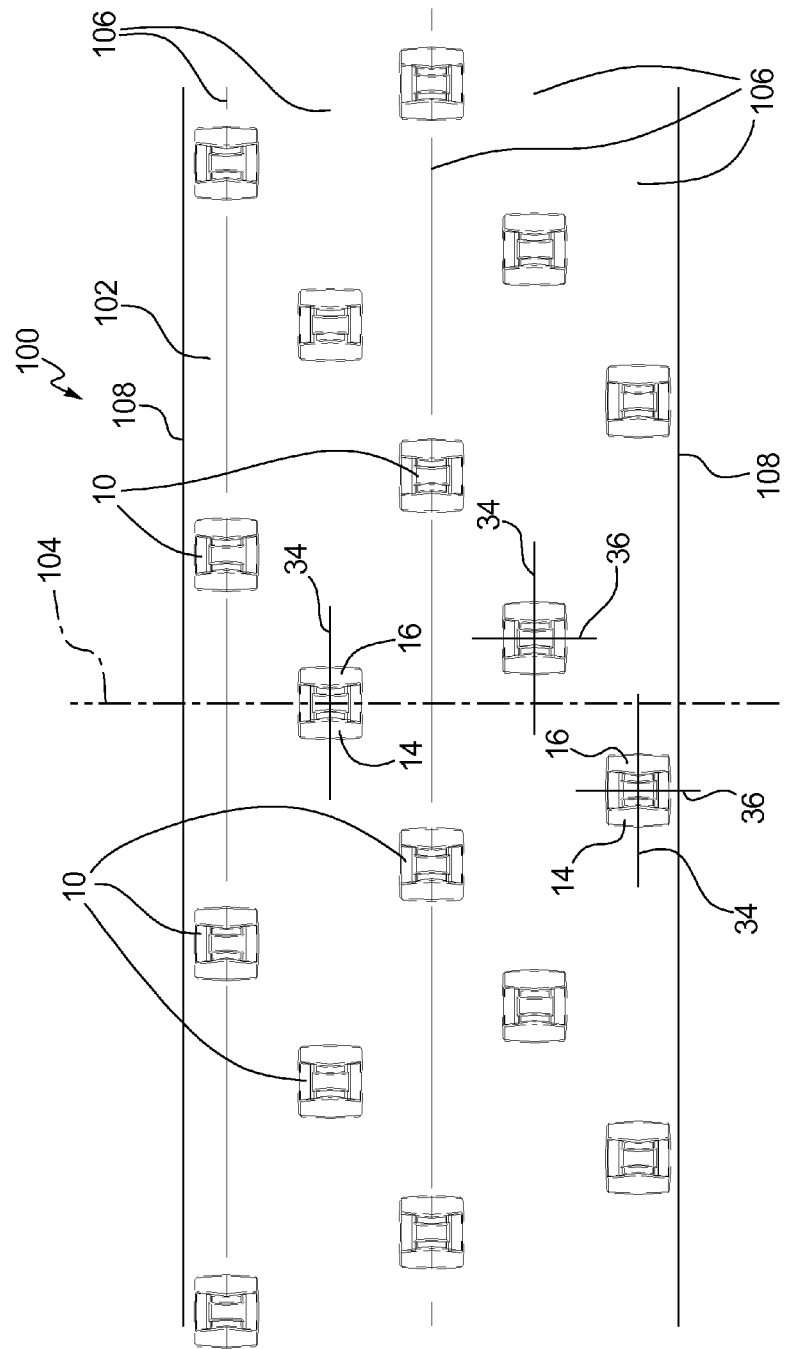
FIG. 11 is top view of the compactor wheel of FIG. 9 with the wheel wrapper flattened out and the compactor wheel tips oriented in a first position.

On the compactor wheels 100, 110 of FIGS. 9 and 10, the wheel engaging surfaces of the bottom walls 12 may be contoured so that the front and rear walls 14, 16 are generally perpendicular to the direction of travel of the compactor wheels 100, 110. As further illustrated in FIG. 11, in which the wheel wrapper 102 may be flattened to show the arrangement of the tips 10 on the wheel 100. The rotational axis of the wheel 100 is illustrated graphically by a line 104, and the tips 10 may be positioned on the wheel wrapper 102 along a plurality of circumferential lines 106 of the wheel 100 spaced across the wheel wrapper 102 between lateral edges 108 of the wheel 100. The wheel engaging surfaces of the bottom wall 12 may be shaped so that the first vertical planes 34 of the tips 10 may be approximately parallel to the circumferential lines 106 and the second vertical planes 36 are approximately parallel to the rotational axis 104 of the wheel 100 when the tips 10 are attached to the wheel wrapper 102. Consequently, the side portions of the wheel engaging surfaces may have a curvature from front to rear approximating the curvature of the wheel wrapper 102, while the edges of the surface proximate the front and rear walls 14, 16 may be approximately linear. The wheel 110 may have a similar appearance with the wheel wrapper 112 laid flat, but with some of the tips 10 being replaced by side-slope compactor wheel tips 80 to provide additional side-slope traction.

Figure 12:
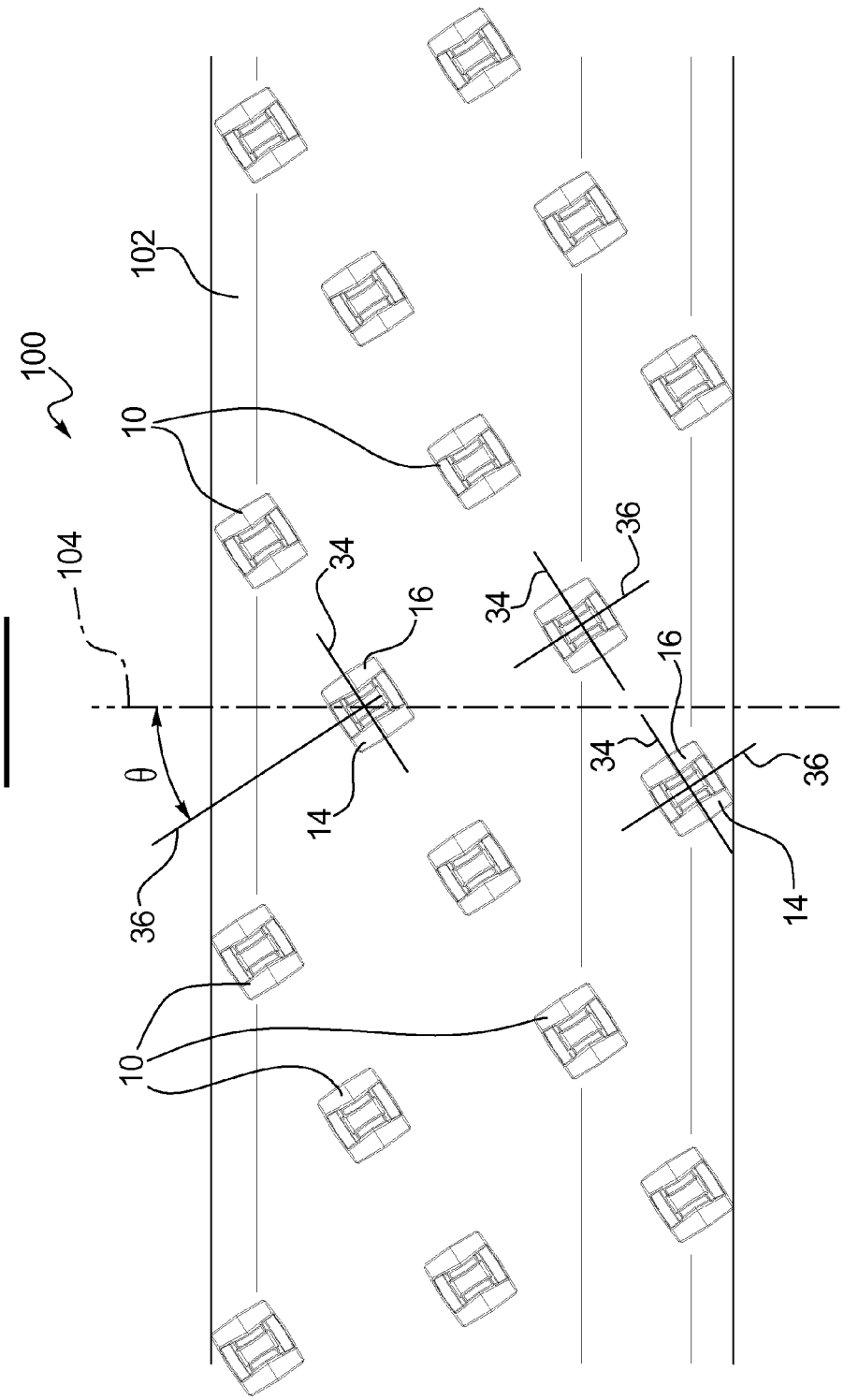
FIG. 12 is a top view of the compactor wheel of FIG. 9 with the wheel wrapper flattened out and the compactor wheel tips oriented in an offset position with respect to the wheel's rotational axis.

In some implementations, it may be desirable to purposely direct material toward one of the lateral edges 108 of the wheel 100, or to provide additional side-slope traction by means other than or in addition to the side-slope traction tips 80 shown in FIG. 8. To that end, it may be desired to reconfigure the wheel engaging surface of the bottom walls 12 to orient the tips 10 at angles with respect to the rotational axis 104 of the wheel 100. Referring to FIG. 12, the wheel engaging surfaces may be contoured so that the second vertical planes 36 of the tips 10 are rotated with respect to the rotational axis 104 by an offset angle $\Theta$ when the tips 10 are attached to the wheel wrapper 102. In the illustrated embodiment, wheel engaging surfaces may have a curvature from one corner of the front wall 14 to the opposite corner of the rear wall 16 matching the curvature of the wheel wrapper 102.

Depending on the desired amount of rotation of the tips 10, the wheel engaging surface may be contoured to provide an offset angle $\Theta$ of as much as approximately 45°, or may be within a range from 5° to 45°, such as the ranges from 10° to 40°, 15° to 35°, and 20° to 30°, or may have a value of approximately 25°. In some implementations, it may be desired have the offset angle $\Theta$ be approximately equal to the pocket angle $\Phi_w$ of the front and rear walls 14, 16. In such cases, the offset angle $\Theta$ may have a value up to approximately 10°, and may be within the range from 2.5° to 5.5°, such as angles of approximately 3° or approximately 5°, depending on the value of the pocket angle $\Phi_w$. Where the tips 10 are rotated by an offset angle $\Theta$, the edges of the surface proximate the front and rear walls 14, 16 may have a curvature approximating the curvature of the wheel wrapper 102 in a similar manner as the side portions of the wheel engaging surfaces. With the tips 10 rotated toward the offset angle $\Theta$, surface material may be directed toward one of the sides of the wheel 100 by the slopes provided by the angled front and rear walls 14, 16, and an additional amount of side-slope traction may result from the increased surface area of the tips 10 presented in the direction of the rotational axis of the wheel 100 than with the tips 10 orientation shown in FIG. 11.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fail within the scope of the claims defining the invention.

| LIST OF ELEMENTS TITLE: Paddle Style Land Fill Compactor Wheel Tip FILE: 09-236 | |
|---|---|
| 10 | compactor wheel tip |
| 11 | |
| 12 | bottom wall |
| 13 | |
| 14 | front wall |
| 15 | |
| 16 | rear wall |
| 17 | |
| 18 | side wall |
| 19 | |
| 20 | side wall |
| 21 | |
| 22 | top wall |
| 23 | |
| 24 | vertical top portion |
| 25 | |
| 26 | vertical bottom portion |
| 27 | |
| 28 | curved intermediate portion |
| 29 | |
| 30 | butter bead |
| 31 | |
| 32 | centerline |
| 33 | |
| 34 | first vertical plane |
| 35 | |
| 36 | second vertical plane |
| 37 | |
| 38 | centerline |
| 39 | |
| 40 | shoulder |
| 41 | |
| 42 | rib |
| 43 | |
| 44 | exterior pocket |
| 45 | |
| 46 | pocket edge |
| 47 | |
| 48 | pocket wall |
| 49 | |
| 50 | interior pocket |
| 51 | |
| 52 | |
| 53 | |
| 54 | |
| 55 | |
| 56 | |
| 57 | |
| 58 | |
| 59 | |
| 60 | flat top compactor wheel tip |
| 61 | |
| 62 | bottom wall |
| 63 | |
| 64 | front wall |
| 65 | |
| 66 | rear wall |
| 67 | |
| 68 | side wall |
| 69 | |
| 70 | butter bead |
| 71 | |
| 72 | top wall |
| 73 | |
| 74 | |
| 75 | |
| 76 | |
| 77 | |
| 78 | |
| 79 | |

| LIST OF ELEMENTS TITLE: Paddle Style Land Fill Compactor Wheel Tip FILE: 09-236 | |
|---|---|
| 80 | side-slope compactor wheel tip |
| 81 | |
| 82 | bottom wall |
| 83 | |
| 84 | front wall |
| 85 | |
| 86 | rear wall |
| 87 | |
| 88 | side wall |
| 89 | |
| 90 | side wall |
| 91 | |
| 92 | top wall |
| 93 | |
| 94 | |
| 95 | |
| 96 | |
| 97 | |
| 98 | |
| 99 | |
| 100 | landfill compactor wheel |
| 101 | |
| 102 | wheel wrapper |
| 103 | |
| 104 | rotational axis |
| 105 | |
| 106 | circumferential line |
| 107 | |
| 108 | lateral edge |
| 109 | |
| 110 | landfill compactor wheel |
| 111 | |
| 112 | wheel wrapper |
| 113 | |
| 114 | |

What is claimed is:

1. A compactor wheel tip, comprising:
a bottom wall having a wheel engaging surface;
a top wall having a ground engaging surface;
oppositely disposed front and rear walls extending upwardly from the bottom wall to the top wall, the front and rear walls having a concave shape, with the distance between the front and rear walls being greater proximate the bottom wall than proximate the top wall; and
a pair of oppositely disposed side walls extending upwardly from the bottom wall to the top wall,
wherein the ground engaging surface defines a pair of shoulders each extending inwardly from a corresponding one of the side walls, and a rib extending between the shoulders and having a depth that is less than the depth of shoulders, and
wherein the ground engaging surface defines a pair of exterior pockets disposed on opposite sides of the rib and extending between the shoulders, wherein the exterior pockets extend downwardly between the rib and corresponding portions of the front and rear walls.

2. A compactor wheel tip according to claim 1, wherein intersecting portions of the top wall and the front and rear walls proximate the exterior pockets define upper edges of the respective exterior pockets, and wherein a portion of the ground engaging surface defining the rib is higher with respect to the bottom wall than the upper edges of the exterior pockets.

3. A compactor wheel tip according to claim 1, wherein portions of the front and rear walls proximate the top wall extend outwardly from a first vertical plane bisecting the compactor wheel tip from front to back at a pocket angle Φ with respect to a line perpendicular to the first vertical plane such that the distance between the front and rear walls increases as the front and rear walls extend outwardly from the first vertical plane toward the side walls, and wherein portions of the ground engaging surface defining front and rear walls of the exterior pockets extend outwardly from the first vertical plane at the pocket angle Φ.

4. A compactor wheel tip, comprising:
a bottom wall having a wheel engaging surface;
a top wall having a ground engaging surface;
oppositely disposed front and rear walls extending upwardly from the bottom wall to the top wall with the distance between the front and rear walls decreasing as the front and rear walls extend from the bottom wall toward the top wall; and
a pair of oppositely disposed side walls extending from the bottom wall to the top wall and having lateral edges intersecting with corresponding lateral edges of the front and rear walls,
wherein the ground engaging surface defines a pair of shoulders each extending inwardly from a corresponding one of the side walls, a rib extending between the shoulders, and a pair of exterior pockets disposed on opposite sides of the rib and extending between the shoulders, wherein the exterior pockets extend downwardly between the rib and corresponding portions of the front and rear walls, and
wherein the front and rear walls each have a curved portion having a curvature causing the distance between the front and rear walls to decrease as the curved portions extend upwardly away from the bottom wall and toward the top wall, wherein the curved portions of each of the front and rear walls extend outwardly from a first vertical plane bisecting the compactor wheel tip from front to back at a pocket angle Φ with respect to a line perpendicular to the first vertical plane such that the distance between the front and rear walls increases as the front and rear walls extend outwardly from the first vertical plane toward the side walls.

5. A compactor wheel tip according to claim 4, wherein the front and rear walls each have generally vertical top portions disposed between the top wall and corresponding curved portions, and wherein the top portions of the front and rear walls extend outwardly from the first vertical plane toward the side walls with the same pocket angle Φ as the curved portions.

6. A compactor wheel tip according to claim 4, wherein the front and rear walls each have generally vertical bottom portions disposed between the bottom wall and corresponding curved portions, and wherein the bottom portions of the front and rear walls extend outwardly from the first vertical plane at a draft angle Δ with respect to a line perpendicular to the first vertical plane such that the distance between the front and rear walls decreases as the front and rear walls extend outwardly from the first vertical plane toward the side walls.

7. A compactor wheel tip according to claim 4, wherein portions of the ground engaging surface defining the shoulders are higher with respect to the bottom wall than a portion of the ground engaging surface defining the rib.

8. A compactor wheel tip according to claim 7, wherein intersecting portions of the top wall and the front and rear walls proximate the exterior pockets define upper edges of the respective exterior pockets, and wherein the portion of the ground engaging surface defining the rib is higher with respect to the bottom wall than the upper edges of the exterior pockets.

9. A compactor wheel tip according to claim 4, wherein the side walls extend outwardly from a second vertical plane bisecting the compactor wheel tip from side to side at a draft angle Δ with respect to a line perpendicular to the second vertical plane such that the distance between the side walls decreases as the side walls extend outwardly from the second vertical plane toward the front and rear walls.

* * * * *